United States Patent
Bhogal et al.

(10) Patent No.: US 9,076,130 B2
(45) Date of Patent: Jul. 7, 2015

(54) IDENTIFYING A WEBPAGE FROM WHICH AN E-MAIL ADDRESS IS OBTAINED

(75) Inventors: Kulvir S. Bhogal, Pflugerville, TX (US); Lisa Seacat Deluca, San Francisco, CA (US); Robert R. Peterson, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 190 days.

(21) Appl. No.: 13/608,851

(22) Filed: Sep. 10, 2012

(65) Prior Publication Data

US 2014/0074942 A1 Mar. 13, 2014

(51) Int. Cl.
*G06Q 10/10* (2012.01)
(52) U.S. Cl.
CPC ...................................... *G06Q 10/10* (2013.01)
(58) Field of Classification Search
CPC .... G06F 15/16; G06Q 30/016; G06Q 10/107; H04L 12/5885
USPC .......................................... 709/206; 715/752
See application file for complete search history.

(56) References Cited

U.S. PATENT DOCUMENTS

| 7,596,594 | B2 * | 9/2009 | Karp | 709/203 |
| 7,739,609 | B2 * | 6/2010 | Yoshida | 715/752 |
| 2009/0113003 | A1 * | 4/2009 | Lu et al. | 709/206 |
| 2011/0202847 | A1 * | 8/2011 | Dimitrov | 715/738 |

OTHER PUBLICATIONS

"Inserting a Dynamic URL in to a MAILTO: tag," Jelsoft Enterprises Ltd., Jul. 29, 2003, <http://www.velocityreviews.com/forums/t92107-inserting-a-dynamic-url-in-to-a-mailto-tag.html>, 6 pgs.*

"System and Method for point-in-time contents of a URL with its associated reference in a message," Jan. 14, 2009, <http://ip.com/IPCOM/000178032#>, 3 pgs.*

"System and Method for point-in-time contents of a URL with its associated reference in a message," Jan. 14, 2009, <http://ip.com/IPCOM/000178032#>.*

"Inserting a Dynamic URL in to a MAILTO: tag," [online] VelocityReviews.com, Jelsoft Enterprises Ltd., Jul. 29, 2003, [retrieved Sep. 10, 2012] retrieved from the Internet: <http://www.velocityreviews.com/forums/t92107-inserting-a-dynamic-url-in-to-a-mailto-tag.html>, 6 pgs.

"System and Method for point-in-time contents of a URL with its associated reference in a message." [online] IP.com, Jan. 14, 2009 [retrieved Sep. 10, 2012] retrieved from the Internet: <http://ip.com/IPCOM/000178032#>, 1 pg.

* cited by examiner

*Primary Examiner* — Kevin Bates
*Assistant Examiner* — Chen-Liang Huang
(74) *Attorney, Agent, or Firm* — Cuenot, Forsythe & Kim, LLC (57) ABSTRACT

Detecting an e-mail client generating a first e-mail identifying as a recipient e-mail address an e-mail address identified in the webpage. A screen shot of the webpage can be captured. An association can be automatically created between the screen shot of the webpage and the first e-mail, and the screen shot of the webpage is stored. The first e-mail is sent to the recipient e-mail address. Responsive to receiving or opening the first e-mail or a second e-mail related to the first e-mail, the screen shot of the webpage can be automatically retrieved and presented.

20 Claims, 4 Drawing Sheets

IDENTIFYING A WEBPAGE FROM WHICH AN E-MAIL ADDRESS IS OBTAINED

BACKGROUND

The embodiments disclosed within this specification relate to the use of electronic mail (e-mail).

The use of e-mail has become an important means of communication in recent decades. E-mail is used to digitally communicate a message from a sender to one or more recipients. Modern modes of e-mail communication operate across the Internet and/or other communication networks. Today's e-mail systems typically are based on a store-and-forward model. With this model, e-mail servers accept, forward, deliver and store e-mail messages. E-mail clients typically are used to generate and send outgoing emails, and to receive and view incoming e-mails. E-mail clients may be resident on a local processing system, such as a computer, smart phone, or the like, or resident on a server accessed by a processing system.

BRIEF SUMMARY

One or more embodiments disclosed within this specification relate to identifying a webpage from which an e-mail address is obtained.

An embodiment can include detecting an e-mail client generating a first e-mail identifying as a recipient e-mail address an e-mail address identified in the webpage. A screen shot of the webpage can be captured. An association can be automatically created between the screen shot of the webpage and the first e-mail, and the screen shot of the webpage is stored. The first e-mail is sent to the recipient e-mail address. Responsive to receiving or opening the first e-mail or a second e-mail related to the first e-mail, the screen shot of the webpage can be automatically retrieved and presented.

Another embodiment can include a system comprising a processor configured to initiate executable operations. The processor can be configured to detect an e-mail client generating a first e-mail identifying as a recipient e-mail address an e-mail address identified in a webpage. The processor can capture a screen shot of the webpage. The processor can automatically create an association between the screen shot of the webpage and the first e-mail, and can store the screen shot of the webpage. The processor can send the first e-mail to the recipient e-mail address. Responsive to receiving or opening the first e-mail or a second e-mail related to the first e-mail, the processor can automatically retrieve and present the screen shot of the webpage.

Another embodiment can include a computer program product for identifying a webpage from which an e-mail address is obtained. The computer program product can include a computer-readable storage medium having stored thereon program code that, when executed, configures a processor to perform operations including detecting an e-mail client generating a first e-mail identifying as a recipient e-mail address an e-mail address identified in the webpage. A screen shot of the webpage can be captured. An association can be automatically created between the screen shot of the webpage and the first e-mail, and the screen shot of the webpage is stored. The first e-mail is sent to the recipient e-mail address. Responsive to receiving or opening the first e-mail or a second e-mail related to the first e-mail, the screen shot of the webpage can be automatically retrieved and presented

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

Arrangements described herein relate to identifying a webpage from which an e-mail address is obtained. More particularly, when a user initiates creation of an e-mail addressed to a recipient e-mail address identified in the webpage, a screen shot of the webpage is automatically captured. An association between the screen shot and the e-mail is automatically created, and the e-mail is sent to the recipient. When another e-mail responding to the first e-mail is retrieved or opened, the screen shot is automatically retrieved and presented to the user. Thus, when the user retrieves or opens the subsequent e-mail, the user will be informed of the information contained on the webpage at the time the first e-mail was created. Accordingly, any uncertainty as to the content of the webpage, and hence the subject of the e-mail, can be mitigated.

As used within this specification and the claims that follow, the term "e-mail" means "electronic mail," as is commonly used by those skilled in the art. In this regard, an e-mail is an electronic transmission of a letter, message or memo through a communication network. An e-mail also may include attachments or other information, such as metadata, uniform resource identifiers (URIs) (e.g., uniform resource locators (URLs)), or the like.

As used herein, the term "screen shot" means a digital image or file containing all or part of what is seen on a display of a processing system. In illustration, a screen shot can contain information presented by a particular application on a display, or can contain all information presented on the display. The digital image or file may be formatted in accordance with any suitable digital image format. For example, the digital image or file may be formatted in portable document format (PDF), tagged image format (TIFF), joint photo experts group (JPEG) format, bitmap format, or any other format suitable for storing a digital image or file.

Figure 1:
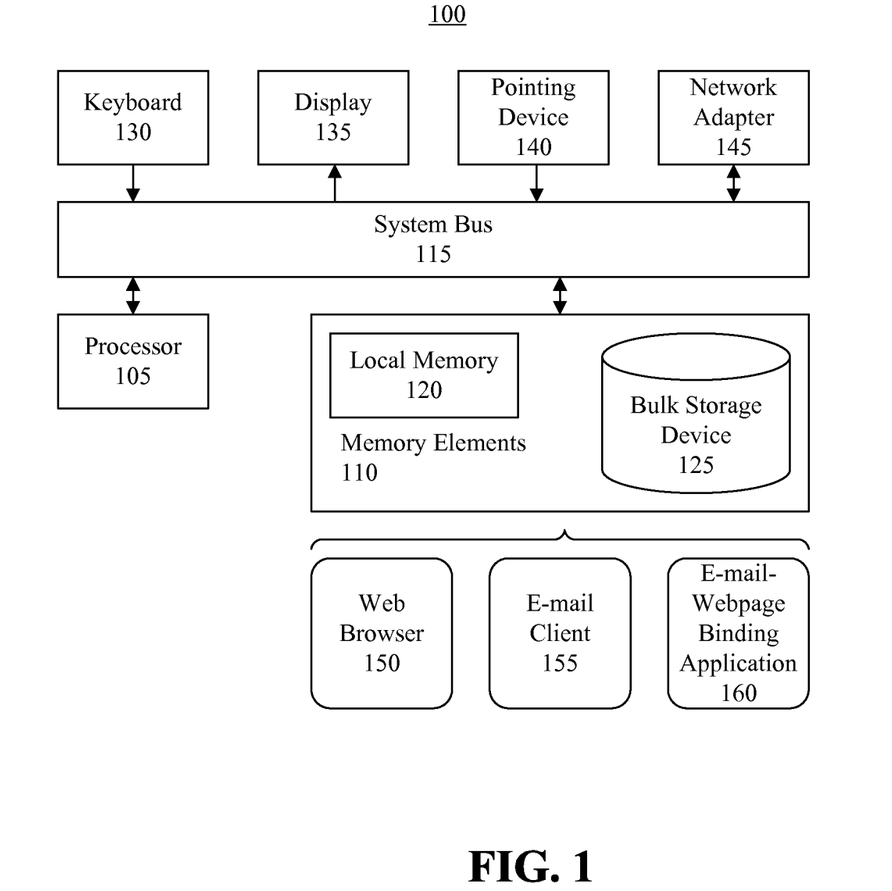
FIG. 1 is a block diagram illustrating a system for identifying a webpage from which an e-mail address is obtained in accordance with one embodiment disclosed within this specification.

FIG. 1 is a block diagram illustrating a system 100 for identifying a webpage from which an e-mail address is obtained in accordance with one embodiment disclosed within this specification. The system 100 can include at least one processor 105 coupled to memory elements 110 through a system bus 115 or other suitable circuitry. As such, the system 100 can store program code within the memory elements 110. The processor 105 can execute the program code accessed from the memory elements 110 via the system bus 115. In one aspect, for example, the system 100 can be implemented as a computer that is suitable for storing and/or executing program code. It should be appreciated, however, that the system 100 can be implemented in the form of any system including a processor and memory that is capable of performing the functions and/or operations described within this specification. For example, the system 100 can be implemented as a workstation, a server, a mobile computer, a laptop computer, a tablet computer, a smart phone, a personal digital assistant, or the like.

The memory elements 110 can include one or more physical memory devices such as, for example, local memory 120 and one or more bulk storage devices 125. Local memory 120 refers to RAM or other non-persistent memory device(s) generally used during actual execution of the program code. The bulk storage device(s) 125 can be implemented as a hard disk drive (HDD), solid state drive (SSD), or other persistent data storage device. The system 100 also can include one or more cache memories (not shown) that provide temporary storage of at least some program code in order to reduce the number of times program code must be retrieved from the bulk storage device 125 during execution.

Input/output (I/O) devices such as a keyboard 130, a display 135, and a pointing device 140 optionally can be coupled to the system 100. The I/O devices can be coupled to the system 100 either directly or through intervening I/O controllers. One or more network adapters 145 also can be coupled to the system 100 to enable the system 100 to become coupled to other systems, computer systems, remote printers, and/or remote storage devices through intervening private or public networks. Modems, cable modems, and Ethernet cards are examples of different types of network adapters 145 that can be used with the system 100.

As pictured in FIG. 1, the memory elements 110 can store a web browser 150, an e-mail client 155, and an e-mail-webpage binding application (hereinafter "binding application") 160. Being implemented in the form of executable program code, the web browser 150, e-mail client 155 and binding application 160 can be executed by the system 100 (e.g., via the processor 105) and, as such, can be considered part of the system 100.

In one aspect, the web browser 150, e-mail client 155, and/or binding application 160, rather than being stored in the memory elements 110, can be stored remote to the memory elements 110, for example on a server or peripheral device, to which the system 100 is communicatively linked. In illustration, the e-mail client 155 can be provided to the system 100 via the web browser 150. Nonetheless, in accordance with the arrangements described herein, even if executed by a processor of a different system, the web browser 150, e-mail client 155, and binding application 160 still may be considered to be a components of the system 100 when the system 100 accesses such components from another system. In this regard, one or more other systems communicatively linked to the processor 105 via the system bus 115 and/or the network adapter 145 can be considered to be components of the system 100 when such systems are accessed by the processor 105 executing suitable program code.

In one arrangement, the binding application 160 can be a stand-alone application that interfaces with the web browser 150 and the e-mail client 155. In another arrangement, the binding application 160 can be a component of the e-mail client 155 (e.g., as a native function or plug-in) and configured to interface with the web browser 150. In yet another arrangement, the binding application 160 can be a component of the web browser 150 (e.g., as a native function or plug-in) and configured to interface with the e-mail client 155. Still, in another arrangement the binding application 160 can be a component a processing system or another application executed on the system 100 via the processor 105.

Figure 2:
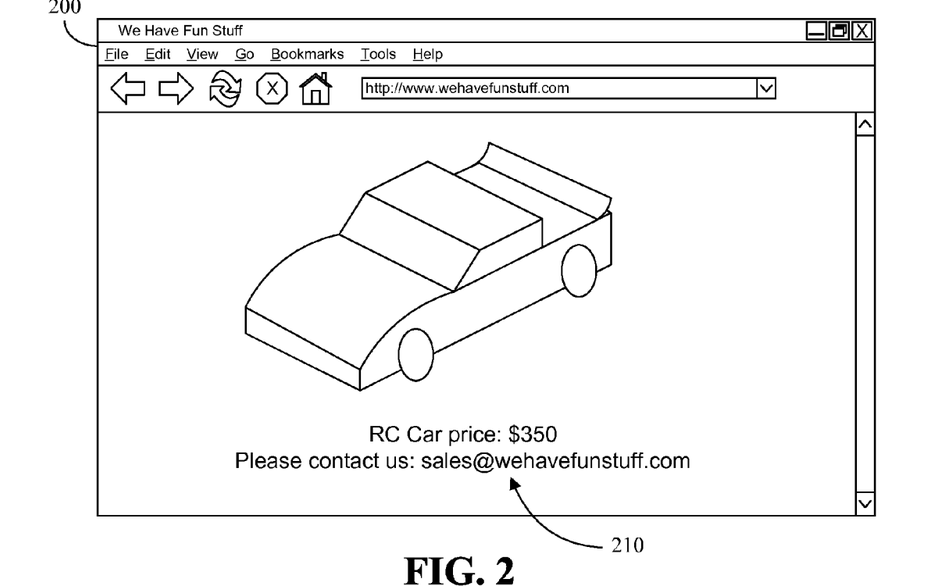
FIG. 2 depicts an example of a webpage accessed by a user in accordance with one embodiment disclosed within this specification.

In operation, a user of the system 100 can navigate the web browser 150 to a particular webpage in order to access the webpage. FIG. 2 depicts an example of a webpage 200 accessed by a user in accordance with one embodiment disclosed within this specification. The webpage 200 can provide an e-mail address 210 to which e-mails may be directed concerning products, services, or any other information to which the webpage 200 pertains.

Figure 3:
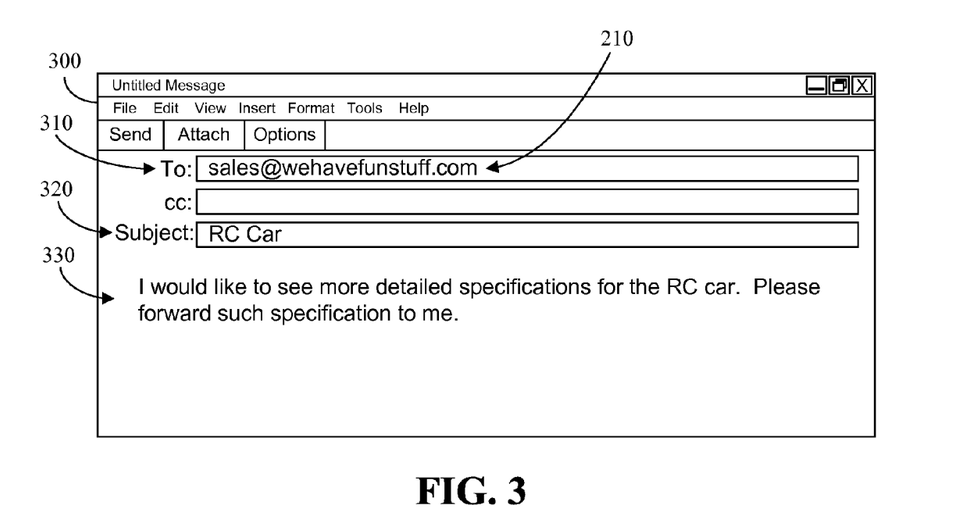
FIG. 3 depicts an example of an e-mail generated in accordance with one embodiment disclosed within this specification.

In one arrangement, the e-mail address 210 can be a hyperlink that, when selected, initiates creation of an e-mail addressed to the e-mail address 210. For example, when a user selects the e-mail address 210, the system 100 can automatically invoke the e-mail client 155 to generate an e-mail identifying as a recipient e-mail address the e-mail address 210. FIG. 3 depicts an example of an e-mail 300 generated in accordance with one embodiment disclosed within this specification. By way of example, when the e-mail is generated, the system 100 can automatically populate a "To" field 310 with the e-mail address 210. The system 100 also can automatically populate a "Subject" field 320 with a subject, such as the subject of the webpage 200. The binding application 160 can detect when the e-mail client 155 generates the e-mail 300 identifying as a recipient e-mail address the e-mail address 210 identified in the webpage.

In another arrangement, the system 100 can invoke the e-mail client 155 to generate the e-mail 300 in response to user inputs received via the e-mail client 155. For example, the user can select an icon, button or menu item in the e-mail client 155 to instruct the system 100 to create the e-mail 300. In this arrangement, the user can populate the "To" field 310 and "Subject" field 320 using the keyboard 130, display 135 (e.g., when the display 135 is a touchscreen) and/or the pointing device 140, for example by typing, selecting or copying/pasting alphanumeric text. When the user enters the e-mail address 210 into the "To" field 310, the binding application 160 can detect whether the entered e-mail address matches the e-mail address 210 presented by the webpage 200. For example the binding application 160 can determine whether the entered e-mail address matches the e-mail address 210 while the webpage 200 is presented on the display 135 via the web browser 150, while the web browser 150 presenting the webpage 200 is minimized (and thus not currently shown on the display 135), or the entered e-mail address matches the e-mail address 210 of the webpage 200 if the webpage 200 recently was presented via the display 135, but is no longer open in the web browser 150. In this regard, the binding application 160 can maintain a history of webpages currently open, and previously accessed, by the web browser 150, including content of such web pages.

Regardless of whether the e-mail address 210 is automatically populated into the "To" field 310 or populated by the user, when the system 100 detects that the e-mail 300 generated by the e-mail client 155 is addressed to the e-mail address 210 identified in the webpage 200, the system 100 can automatically capture a screen shot of the webpage 200. In illustration, the binding application 160 can interface with an operating system and/or another application executed on the system 100 to perform the screen capture.

In a further arrangement, rather than invoking the e-mail client 155, the e-mail can be created using a form presented by the webpage 200. In this regard, the system 100 can automatically capture a screen shot of the webpage 200 which depicts the e-mail created using the form, for example when the e-mail is sent. The binding application 160 can associate the screen shot with an indicator identifying the webpage 200 in a history of webpages currently open, and previously accessed, by the web browser 150. One or more identifiers or data corresponding to form options and/or form content also can be associated with the screen shot. Further, the user can be prompted to enter comments relating to the e-mail and/or webpage 200, and such comments can be associated with the screen shot. At any time the user can access the history of webpages to view sent e-mails originating from the webpage 200, comments relating to the sent e-mails and/or the webpage 200, form options and/or form content.

Figure 4:
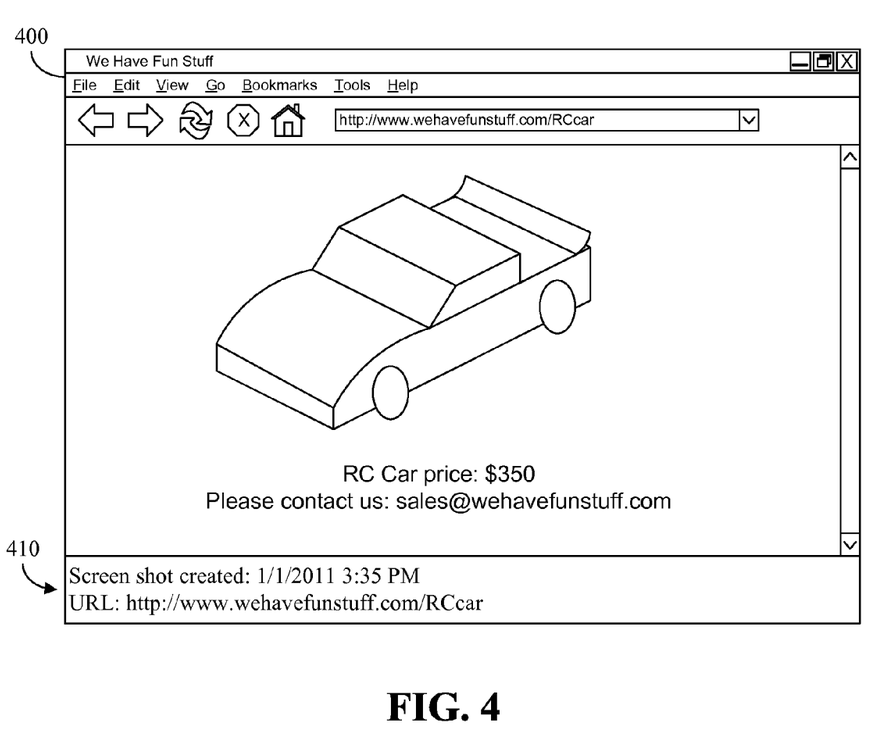
FIG. 4 depicts an example of a screen shot of a webpage captured in accordance with one embodiment disclosed within this specification.

FIG. 4 depicts an example of a screen shot 400 of the webpage 200 captured in accordance with one embodiment disclosed within this specification. In one non-limiting arrangement, the system 100 (e.g., via the binding application 160) can append the screen shot 400 with additional information 410, for example to indicate when the screen shot was created (e.g., captured), to indicate the URI (e.g., URL) of the webpage 200, and so on. The screen shot 400 can be output to, and stored within, the memory elements 110, or to memory elements (not shown) in another system to which the system 100 is communicatively linked, for example via the network adapter 145, or any other suitable input/output device or port. The storage location can be determined by the binding application 160. For example, the system 100 can store the screen shot 400 to a directory associated with the e-mail client 155. The directory can be contained in the memory elements 110, or on another system with which the system 100 is communicatively linked. In one arrangement, the directory can be contained in one or more storage devices in a cloud computing environment to which the system 100 is communicatively linked.

Further, the binding application 160 can automatically create an association between the screen shot 400 of the webpage 200 and the e-mail 300. For example, the binding application 160 can associate metadata with the screen shot 400 that identifies the e-mail 300, the binding application 160 can add metadata to the e-mail 300 that identifies the screen shot 400, the binding application 160 can associate metadata with a retained copy of the e-mail 300 that identifies the screen shot 400, the binding application 160 can store the screen shot 400 in a file or directory associated with the e-mail 300, the binding application 160 can attach the screen shot 400 to a retained copy of the e-mail 300, the binding application 160 can store information associating the screen shot 400 with the e-mail 300 into a data table, or the like.

In the case that the binding application 160 adds metadata to the e-mail 300, or to a retained copy of the e-mail 300, that identifies the screen shot 400, the metadata can be added to a header of the e-mail 300, a body of the e-mail 300, a footer of the e-mail 300, or to any other suitable portion of the e-mail 300. The metadata need not be viewable to a user when the e-mail is presented in a conventional e-mail view, but nonetheless can be configured so as to be identifiable by the system 100. Moreover, the metadata can be placed into the e-mail 300 in a suitable manner so that any reply to the e-mail 300, or forwarding of the e-mail 300, also will include the metadata. In another arrangement, to create the association between the screen shot 400 of the webpage 200 and the e-mail 300, the binding application 160 can add to the e-mail 300 a URI (e.g. URL) corresponding to the webpage 200. For example, in an arrangement in which the screen shot 400 is stored on another system or in a cloud computing environment, the metadata can include a URI that identifies the storage location and screen shot 400.

Via the e-mail client 155, the system 100 can send the e-mail 300 (hereinafter referred to as the "first e-mail"), to the recipient e-mail address 210 identified in the "To" field 310.

At some time, the e-mail client 155 can receive a second e-mail related to the first e-mail 300. For example, such e-mail can be a response to an initial copy of the first e-mail 300, or a response to a copy of the first e-mail 300 that has been forwarded. Responsive to the e-mail client 155 receiving or opening the second e-mail, the system 100 can automatically retrieve and present to the user the screen shot 400 of the webpage 200. Further, the system 100 also can automatically retrieve and present to the user the screen shot 400 of the webpage 200 in response to the e-mail client 155 receiving or opening the first e-mail. Thus, when the user later views the first e-mail or a second related e-mail, the screen shot 400 of the webpage 200 can be presented to the user. The screen shot 400 can be presented as a popup window, as a sidebar window presented in the e-mail client 155, as a popup balloon, or presented in any other suitable manner. Thus, a user receiving the second e-mail will be informed of the information contained in the webpage 200 at the time the first e-mail 300 was created.

The system 100 can determine whether the second e-mail is related to the first e-mail 300 in any of a number of ways. For example, when the second e-mail is received or opened, the binding application 160 can determine whether the e-mail address of the sender of the second e-mail corresponds to the e-mail address of the recipient of the first e-mail 300. If so, the binding application 160 can determine that the second e-mail is related to the first e-mail 300.

In another example, when the second e-mail is received or opened, the binding application 160 can compare information contained in a subject field of the second e-mail to information contained in the "Subject" field 320 of the first e-mail 300. Responsive to determining that the information contained in the subject field of the second e-mail corresponds to the information contained in the "Subject" field 320 of the first e-mail 300, the binding application 160 can determine that the second e-mail is related to the first e-mail 300.

In another example, when the second e-mail is received or opened, the binding application 160 can compare information contained in a body of the second e-mail to information contained in the body 330 of the first e-mail 300. Responsive to determining that the information contained in the body of the second e-mail corresponds to the information contained in the body 330 of the first e-mail 300, the binding application 160 can determine that the second e-mail is related to the first e-mail 300.

In a further example, when the second e-mail is received or opened, the binding application 160 can identify a URI (e.g., URL) and/or metadata contained in the second e-mail and determine whether the URI and/or metadata corresponds to the URI and/or metadata contained in the first e-mail 300. Responsive to determining that the URI and/or metadata contained in the second e-mail corresponds to the URI and/or metadata contained in the first e-mail 300, the binding application 160 can determine that the second e-mail is related to the first e-mail 300.

In another example, the recipient e-mail address 210 can be a first e-mail address corresponding to a particular entity, and the second e-mail can identify as a sender e-mail address for the second e-mail a second e-mail address corresponding to the particular entity. In illustration, the e-mail address of the sender of the second e-mail may not precisely match the e-mail address 210, but may share a common domain (e.g., the first e-mail is sent to sales@wehavefunstuff.com and second e-mail is received from Susan@ wehavefunstuff.com). The binding application 160 can identify the e-mail address 210, and determine that the second e-mail is received from an e-mail address having the same domain to which the first e-mail 300 was sent. Based on this association, the binding application 160 can determine that the second e-mail is related to the first e-mail 300.

Figure 5:
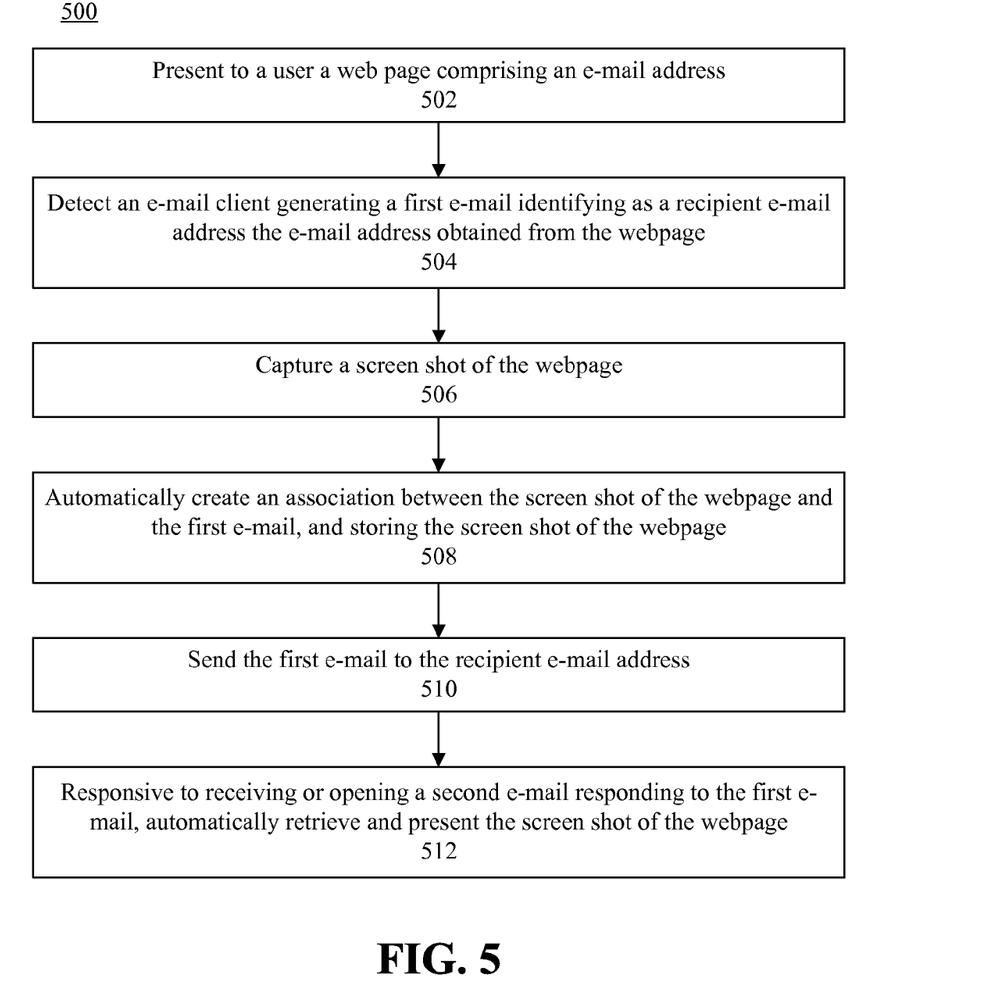
FIG. 5 is a flow chart illustrating a method of identifying a webpage from which an e-mail address is obtained in accordance with another embodiment disclosed within this specification.

FIG. 5 is a flow chart illustrating a method 500 of identifying a webpage from which an e-mail address is obtained in accordance with another embodiment disclosed within this specification. At step 502, a web page comprising an e-mail address can be presented to a user. At step 504, the process of an e-mail client generating a first e-mail can be detected, the first e-mail identifying as a recipient e-mail address the e-mail address obtained from the webpage. At step 506, a screen shot of the webpage can be captured. At step 508, an association between the screen shot of the webpage and the first e-mail can be automatically created. The screen shot of the webpage can be stored. At step 510, the first e-mail can be sent to the recipient e-mail address.

At step 512, responsive to receiving or opening the first e-mail or a second e-mail related to the first e-mail, the screen shot of the webpage can be automatically retrieved and the screen shot can be presented. In illustration, the screen shot can be presented to the user receiving or opening the second e-mail.

Like numbers have been used to refer to the same items throughout this specification. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of identifying a webpage from which an e-mail address is obtained, the method comprising:
   detecting, by a binding application executing on a system comprising at least one processor, an e-mail client generating a first e-mail identifying as a recipient e-mail address the e-mail address identified in the webpage;
   responsive to the e-mail client generating the first e-mail, capturing, by the binding application, a screen shot of the webpage;
   automatically creating, by the binding application, an association between the screen shot of the webpage and the first e-mail, and storing the screen shot of the webpage;
   sending, by the e-mail client, the first e-mail to the recipient e-mail address;
   automatically creating, by the binding application, an association between the screen shot of the webpage and a second e-mail related to the first e-mail, wherein the second e-mail is received by the e-mail client generating the first e-mail;
   responsive to receiving or opening, by the e-mail client, a retained copy of the first e-mail or the second e-mail related to the first e-mail, automatically retrieving and presenting, by the binding application, the screen shot of the webpage.

2. The method of claim 1, wherein storing the screen shot of the webpage comprises storing the screen shot of the webpage to a directory associated with the e-mail client.

3. The method of claim 1, further comprising:
   comparing information contained in a subject field of the second e-mail to information contained in a subject field of the first e-mail; and
   responsive to determining that the information contained in the subject field of the second e-mail corresponds to the information contained in the subject field of the first e-mail, determining that the second e-mail is related to the first e-mail.

4. The method of claim 1, further comprising:
   comparing information contained in a body of the second e-mail to information contained in a body of the first e-mail; and
   responsive to determining that the information contained in the body of the second e-mail corresponds to the information contained in the body of the first e-mail, determining that the second e-mail is related to the first e-mail.

5. The method of claim 1, wherein:
   the recipient e-mail address is a first e-mail address corresponding to a particular entity, and the second e-mail identifies as a sender e-mail address for the second e-mail a second e-mail address corresponding to the particular entity;
   the method further comprising:

determining that the second e-mail is related to the first e-mail based upon the first e-mail address and the second e-mail address both corresponding to the particular entity.

6. The method of claim 1, wherein:
automatically creating an association between the screen shot of the webpage and the first e-mail comprises adding metadata to the first e-mail that identifies the screen shot of the webpage;
the method further comprising:
identifying the metadata in the second e-mail; and
determining that the second e-mail is related to the first e-mail based upon identifying the metadata in the second e-mail.

7. The method of claim 1, wherein:
automatically creating an association between the screen shot of the webpage and the first e-mail comprises adding to the first e-mail a uniform resource identifier corresponding to the webpage;
the method further comprising:
identifying the uniform resource identifier in the second e-mail; and
determining that the second e-mail is related to the first e-mail based upon identifying the uniform resource identifier in the second e-mail.

8. A system comprising:
a processor configured to initiate executable operations comprising:
detecting, by a binding application, an e-mail client generating a first e-mail identifying as a recipient e-mail address an e-mail address identified in a webpage;
responsive to the e-mail client generating the first e-mail, capturing by the binding application, a screen shot of the webpage;
automatically creating, by the binding application, an association between the screen shot of the webpage and the first e-mail, and storing the screen shot of the webpage;
sending, by the e-mail client, the first e-mail to the recipient e-mail address;
automatically creating, by the binding application, an association between the screen shot of the webpage and a second e-mail related to the first e-mail, wherein the second e-mail is received by the e-mail client generating the first e-mail;
responsive to receiving or opening, by the e-mail client, a retained copy of the first e-mail or the second e-mail related to the first e-mail, automatically retrieving and presenting, by the binding application, the screen shot of the webpage.

9. The system of claim 8, wherein storing the screen shot of the webpage comprises storing the screen shot of the webpage to a directory associated with the e-mail client.

10. The system of claim 8, the processor further configured to initiate executable operations comprising:
comparing information contained in a subject field of the second e-mail to information contained in a subject field of the first e-mail; and
responsive to determining that the information contained in the subject field of the second e-mail corresponds to the information contained in the subject field of the first e-mail, determining that the second e-mail is related to the first e-mail.

11. The system of claim 8, the processor further configured to initiate executable operations comprising:
comparing information contained in a body of the second e-mail to information contained in a body of the first e-mail; and
responsive to determining that the information contained in the body of the second e-mail corresponds to the information contained in the body of the first e-mail, determining that the second e-mail is related to the first e-mail.

12. The system of claim 8, wherein:
the recipient e-mail address is a first e-mail address corresponding to a particular entity, and the second e-mail identifies as a sender e-mail address for the second e-mail a second e-mail address corresponding to the particular entity;
the processor further configured to initiate executable operations comprising:
determining that the second e-mail is related to the first e-mail based upon the first e-mail address and the second e-mail address both corresponding to the particular entity.

13. The system of claim 8, wherein:
automatically creating an association between the screen shot of the webpage and the first e-mail comprises adding metadata to the first e-mail that identifies the screen shot of the webpage;
the processor further configured to initiate executable operations comprising:
identifying the metadata in the second e-mail; and
determining that the second e-mail is related to the first e-mail based upon identifying the metadata in the second e-mail.

14. The system of claim 8, wherein:
automatically creating an association between the screen shot of the webpage and the first e-mail comprises adding to the first e-mail a uniform resource identifier corresponding to the webpage;
the processor further configured to initiate executable operations comprising:
identifying the uniform resource identifier in the second e-mail; and
determining that the second e-mail is related to the first e-mail based upon identifying the uniform resource identifier in the second e-mail.

15. A computer program product for identifying a webpage from which an e-mail address is obtained, the computer program product comprising:
a computer-readable storage device, wherein the computer-readable storage device is not a transitory, propagating signal per se, having stored thereon program code that, when executed, configures a processor to perform executable operations comprising:
detecting, by a binding application executed by the processor, an e-mail client generating a first e-mail identifying as a recipient e-mail address the e-mail address identified in the webpage;
responsive to the e-mail client generating the first e-mail, capturing by the binding application, a screen shot of the webpage;
automatically creating, by the binding application, an association between the screen shot of the webpage and the first e-mail, and storing the screen shot of the webpage;
sending, by the e-mail client, the first e-mail to the recipient e-mail address;
automatically creating, by the binding application, an association between the screen shot of the webpage and a second e-mail related to the first e-mail, wherein the second e-mail is received by the e-mail client generating the first e-mail;
responsive to receiving or opening the first e-mail or the second e-mail related to the first e-mail, automatically retrieving and presenting, by the binding application, the screen shot of the webpage.

16. The computer program product of claim 15, wherein the program code further configures the processor to perform executable operations comprising:

comparing information contained in a field of the second e-mail to information contained in a field of the first e-mail; and responsive to determining that the information contained in the field of the second e-mail corresponds to the information contained in the subject field of the first e-mail, determining that the second e-mail is related to the first e-mail.

17. The computer program product of claim 15, wherein:

the recipient e-mail address is a first e-mail address corresponding to a particular entity, and the second e-mail identifies as a sender e-mail address for the second e-mail a second e-mail address corresponding to the particular entity; and the program code further configures the processor to perform executable operations comprising:

determining that the second e-mail is related to the first e-mail based upon the first e-mail address and the second e-mail address both corresponding to the particular entity.

18. The computer program product of claim 15, wherein storing the screen shot of the webpage comprises storing the screen shot of the webpage to a directory associated with the e-mail client.

19. The computer program product of claim 15, wherein:

automatically creating an association between the screen shot of the webpage and the first e-mail comprises adding metadata to the first e-mail that identifies the screen shot of the webpage; and the program code further configures the processor to perform executable operations comprising:

identifying the metadata in the second e-mail; and determining that the second e-mail is related to the first e-mail based upon identifying the metadata in the second e-mail.

20. The computer program product of claim 15, wherein:

automatically creating an association between the screen shot of the webpage and the first e-mail comprises adding to the first e-mail a uniform resource identifier corresponding to the webpage; and the program code further configures the processor to perform executable operations comprising:

identifying the uniform resource identifier in the second e-mail; and determining that the second e-mail is related to the first e-mail based upon identifying the uniform resource identifier in the second e-mail.

\* \* \* \* \*